(12) United States Patent
Ramrakhyani et al.

(10) Patent No.: US 10,423,510 B2
(45) Date of Patent: Sep. 24, 2019

(54) APPARATUS AND METHOD FOR PREDICTING A REDUNDANCY PERIOD

(71) Applicant: ARM LIMITED, Cambridge (GB)

(72) Inventors: Prakash S. Ramrakhyani, Austin, TX (US); Jonathan Curtis Beard, Austin, TX (US)

(73) Assignee: ARM Limited, Cambridge (GB)

( * ) Notice: Subject to any disclaimer, the term of this patent is extended or adjusted under 35 U.S.C. 154(b) by 65 days.

(21) Appl. No.: 15/724,433

(22) Filed: Oct. 4, 2017

(65) Prior Publication Data

US 2019/0102272 A1    Apr. 4, 2019

(51) Int. Cl.
*G06F 11/30* (2006.01)

(52) U.S. Cl.
CPC ...... *G06F 11/3024* (2013.01); *G06F 11/3037* (2013.01); *G06F 2201/885* (2013.01); *G06F 2212/1024* (2013.01)

(58) Field of Classification Search
CPC .... G06F 12/0802; G06F 9/46; G06F 11/3024; G06F 11/3037
See application file for complete search history.

(56) References Cited

U.S. PATENT DOCUMENTS

| | | | | |
|---|---|---|---|---|
| 6,615,316 B1* | 9/2003 | McKenney | ........... | G06F 9/5033 711/118 |
| 7,725,695 B2* | 5/2010 | Williamson | .......... | G06F 9/3844 712/233 |
| 7,761,697 B1* | 7/2010 | Coon | ...................... | G06F 9/322 712/233 |
| 9,652,385 B1* | 5/2017 | Chadwick | ............. | G06F 9/3834 |
| 2004/0107319 A1* | 6/2004 | D'Orto | ............... | G06F 16/9574 711/133 |
| 2006/0168571 A1* | 7/2006 | Ghiasi | ..................... | G06F 9/505 717/127 |
| 2007/0294693 A1* | 12/2007 | Barham | ................ | G06F 9/4881 718/102 |
| 2007/0300086 A1* | 12/2007 | Kwasnick | ............. | G06F 9/5027 713/300 |
| 2011/0173482 A1* | 7/2011 | Penton | ................ | G06F 11/1641 714/2 |
| 2013/0138886 A1* | 5/2013 | Yamauchi | ............... | G06F 9/544 711/120 |
| 2018/0107406 A1* | 4/2018 | O | .......................... | G06F 3/0611 |

* cited by examiner

*Primary Examiner* — Ramon A. Mercado
(74) *Attorney, Agent, or Firm* — Nixon & Vanderhye P.C.

(57) ABSTRACT

An apparatus comprises a plurality of memory units organized as a hierarchical memory system, wherein each of at least some of the memory units is associated with a processor element; predictor circuitry to perform a prediction process to determine a predicted redundancy period of result data of a data processing operation to be performed, indicating a predicted point when said result data will be next accessed; and an operation controller to cause a selected processor element to perform said data processing operation, wherein said selected processor element is selected based on said predicted redundancy period.

16 Claims, 10 Drawing Sheets

| PC Values To Monitor | STL Distance Count | Wrap Around Bit Value | Prediction Count | Destination Address |
|---|---|---|---|---|
| 0010 | 1000100010 | 0 | 00 | 0xFFFF4C00BAC0 |
| 0101 | 111000010 | 1 | 01 | 0xDCC4003CAD10 |
| 0111 | 1111101101 | 1 | 10 | 0xBBA77620088 |
| . | . | . | . | . |
| . | . | . | . | . |
| . | . | . | . | . |
| 1101 | 111000010 | 1 | 11 | 0xEEE500002120 |

| PC Values To Monitor | STL Distance Count | Wrap Around Bit Value | Prediction Count | Destination Address |
|---|---|---|---|---|
| 0010 | 1000100010 | 0 | 00 | 0xFFFF4C00BAC0, 3FF |
| 0101 | 111000010 | 1 | 01 | 0xDCC4003CAD10, 3FF |
| 0111 | 1111101101 | 1 | 10 | 0xBBA77620088, 4FF |
| . | . | . | . | . |
| . | . | . | . | . |
| . | . | . | . | . |
| 1101 | 111000010 | 1 | 11 | 0xEEE500002120, 6DD |

FIG. 10

APPARATUS AND METHOD FOR PREDICTING A REDUNDANCY PERIOD

The present disclosure relates to memory systems. More particularly, the present disclosure relates to memory systems where at least some memory units of the system have an associated processor element.

In previously proposed systems, data is transferred from memory to the CPU so that data processing operations can be performed on the data by the CPU. The memory system may be a hierarchical memory system, and the CPU will typically store the result of the data processing operation in a high level memory unit of the memory system which is near to the CPU so that it can be accessed again relatively quickly.

In some other systems, a number of additional processor elements may be implemented in association with at least some of the memory units of the memory system so that a processor element associated with the memory unit that stores the target data can perform the data processing operation, rather than transferring the target data to the CPU to be performed. Such operations are known as far operations, and are used to reduce the movement of data in a system. However, it is difficult to know the circumstances in which a far operation should be performed.

At least one example described herein provides an apparatus comprising: a plurality of means for association with a means for processing, organised as a hierarchical memory system; predictor circuitry to perform a prediction process to determine a predicted redundancy period of result data of a data processing operation to be performed, indicating a predicted point when said result data will be next accessed; and an operation controller to cause a selected processor element to perform said data processing operation, wherein said selected processor element is selected based on said predicted redundancy period.

At least another example an apparatus comprising: means for a plurality of memory units organised as a hierarchical memory system, wherein each of at least some of said memory units is associated with a means for processing; means for performing a prediction process to determine a predicted redundancy period of result data of a data processing operation to be performed, indicating a predicted point when said result data will be next accessed; and means for selecting a selected means for processing to perform said data processing operation, wherein said selected means for processing is selected based on said predicted redundancy period.

At least another example provides a method for use in an apparatus comprising a plurality of memory units organised as a hierarchical memory system, wherein each of at least some of said memory units is associated with a processor element, said method comprising: performing a prediction process to determine a predicted redundancy period of result data of a data processing operation to performed, indicating a predicted point when said result data will be next accessed; and selecting a selected processor element to perform said data processing operation, wherein said selected processor element is selected based on said predicted redundancy period.

The present invention will be described further, by way of example only, with reference to embodiments thereof as illustrated in the accompanying drawings, in which.

Before discussing the embodiments with reference to the accompanying figures, the following description of embodiments is provided.

In accordance with a first example configuration there is provided an apparatus comprising: a plurality of memory units organised as a hierarchical memory system, wherein each of at least some of said memory units is associated with a processor element; predictor circuitry to perform a prediction process to determine a predicted redundancy period of result data of a data processing operation to be performed, indicating a predicted point when said result data will be next accessed; and an operation controller to cause a selected processor element to perform said data processing operation, wherein said selected processor element is selected based on said predicted redundancy period.

The present technique recognises that a cost of far operations may be incurred in terms of the increased latency that will be experienced should the CPU subsequently require the result data of a far operation. For example, when a data processing operation is performed as a far operation, the processor element that is selected to perform the operation will store the result of the operation in the memory unit that it is associated with. The latency associated with the CPU subsequently accessing this memory unit is higher than the latency associated with the CPU instead accessing, e.g. its own registers. Therefore, it may not always be beneficial to perform a data processing operation as a far operation despite the benefits that are achieved in terms of reduced data transfer. However, this latency of subsequent accesses is easily overlooked when determining whether to perform an operation near or far as the latency is not experienced at the time of the operation, but instead when the result of the operation is once again required, whereas the benefits of reduced data transfer are realised immediately.

The present technique selects a processor element to perform a data processing operation based on a prediction of how soon in the future the result of that data processing operation will be required. The present technique thereby recognises that by considering the predicted redundancy period of the result of a data processing operation, better memory management can be performed. The redundancy period relates to the period for which the data is not used. For example, it could correspond to the period between the result of an instruction being stored and the next subsequent load of that value. It will be appreciated that the period corresponding to the instruction distance may be measured in a variety of ways. In some examples the period corresponding to the instruction distance may be measured in terms of processor cycles. However, in other examples it may also be measured in terms other micro-architectural events such as cache fetches (e.g. misses), or instructions executed. The period could also be measured as a period of time (measured in seconds or a fraction of seconds such as milliseconds or microseconds).

In some examples, a relationship between an access speed of a memory unit associated with said selected processor element and said predicted redundancy period is that as said predicted redundancy period decreases, said access speed increases. Therefore, when it is expected that the access location is to be accessed again soon, the apparatus can thus select a processor element associated with a higher level memory of the hierarchical memory system, which will be faster than the memory units at the lower levels. For example, in response to said predicted redundancy period indicating that said result data will be accessed again within a reuse period, said selected processor element is associated with a faster memory unit that can be accessed more quickly than another of said memory units and said selected processor element stores said result data in said faster memory unit. Similarly, if it is expected that the access location won't be accessed for some time, the apparatus can instead select a processor element associated with one of the slower lower level memory units. For example, in response to said predicted redundancy period indicating an absence of further accesses to said result data within a reuse period, said selected processor element is a processor element associated with a slower memory unit that can be accessed less quickly than said faster memory unit and said selected processor stores said result data in said slower memory unit. This reduces the likelihood of locations in the higher level memory units, which are often in limited supply, from being filled with data that may not be required for a relatively long time, and this data will instead be stored in a lower level, slower memory unit which will typically be in less demand.

In some examples, said prediction processes uses historical data. Previous data processing patterns can often be indicative of patterns that are likely to emerge in future processing. Therefore, by using historical data in said prediction process, it may be possible to improve the prediction.

In some examples, said prediction process uses historical data of a redundancy period of an operand of a previous data processing operation used to generate said result data. This can be a particularly accurate approach for the prediction process. As explained above, the predicted redundancy period of result data of a data processing operation to be performed can be considered to indicate a predicted point when said result data will be next accessed. By analogy, the predicted redundancy period of an operand can therefore be defined as the period for which it is predicted that the operand of the data processing operation will not be accessed, i.e. is redundant. For example, when the operand is an address location, a redundancy period between consecutive accesses to that location can be measured. When the operand is data, a previous redundancy period between the data being generated and being subsequently accessed can be measured. These previous redundancy periods of the operand can serve as a likely indicator of the period between the result data being generated, and a further operation modifying the result data, and is thus a suitable candidate for basing the predicted redundancy period on. In some examples, the operand may have been an operand used to indirectly generate the result data. For example, multiple data processing operations may have been performed on said operand to generate said result data, with a result of each of the multiple data processing operations being an intermediate value. In some other examples, said historical data is a most recent redundancy period of said variable.

In some examples, said data processing operation is performed in response to execution of a given instruction from a series of instructions comprising a loop, and said redundancy period is based on a processing period of one iteration of said loop. When a series of instructions comprises a loop, an accurate prediction of the redundancy period of a data processing operation performed in response to a given instruction of the loop can often be made. This is because this instruction will be repeatedly executed at regular intervals.

In some examples, the apparatus further comprises a non-saturating counter to increment during said one iteration of said loop, and a saturating counter to determine a wrap around count of said non-saturating counter, wherein said prediction process uses said wrap around count. The wrap around count can used to decide which of the plurality of processor elements to select to perform the operation, with a smaller wrap around count being assigned to a processor associated with faster memory and a larger wrap around count being associated to a processor associated with a slower memory.

In some examples, said prediction processes is affected by a bias value; and said bias value is adjusted by comparing a previously predicted redundancy period of further result data with a redundancy period of said further result data. Therefore, a determination can be made of whether a previously predicted redundancy period was accurate in terms of the redundancy period that actually occurred. On this basis, subsequent predictions can be biased to compensate for inaccuracy. For example, in some examples, when said previously predicted redundancy period is less than said redundancy period of said result data, said bias value is adjusted to bias selection towards a processor element associated with a slower memory unit, and when said bias value indicates that said previously predicted redundancy period is greater than said redundancy period said predictor circuitry is configured to bias selection towards a processor element associated with a faster memory unit.

In some examples, said prediction processes is affected by a bias value; said operation controller is adapted to cause a previous selected processor element to perform a previous data processing operation to produce previous result data; said previous result data is stored in one of said plurality of memory units associated with said previous selected processor element; and said bias value is adjusted by whether a previous access request for said previous result data hits or misses in said one of said plurality of memory units associated with said previous selected processor element. Each cache in the memory hierarchy holds a limited amount of data, with slower memory units holding more data. Accordingly, it eventually becomes necessary to move data from a faster memory unit to a slower memory unit by a process known as eviction. Typically, a Least Recently Used mechanism is used so that data that has been accessed the least recently is evicted to a lower cache. Accordingly, if an access request misses when it is made towards a memory unit when using the above technique this can be an indication that the data was sent to the wrong cache and has since been evicted.

In some embodiments, said bias value is adjusted to bias selection towards a processor element associated with a slower memory unit in response to said previous access request missing. Accordingly, the bias value can be adjusted to compensate for this so that in the future, it is less likely that result data will be sent to a cache where it is evicted. In this way, cache misses can be avoided, which consequently improve the efficiency of the system by not having to query multiple memory units in order to acquire the desired data.

In some examples, said data processing operation is performed as an atomic operation.

In some examples, the operation controller is configured to provide said selected processor with exclusive use of source data required to perform said data processing operation.

In some examples, said data processing operation is performed in response to one of: a microinstruction; an instruction; or a task comprising a plurality of instructions. Thus the present technique can be flexibly applied to any entity that causes data processing operations.

Some particular embodiments will now be described with reference to the figures.

Figure 1:
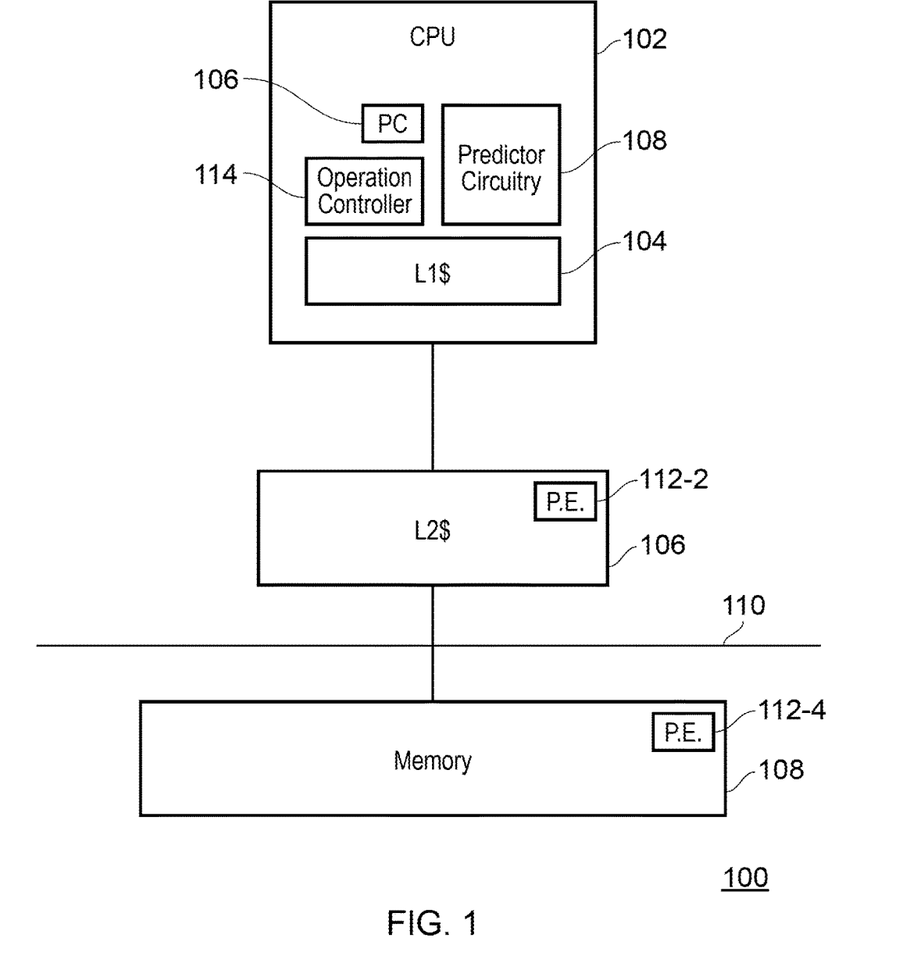
FIG. 1 schematically illustrates one example of an apparatus according to the present technique.

FIG. 1 shows one example of an apparatus 100 according to the present technique. The apparatus 100 comprises a central processing unit (CPU) 102, and a three tier memory system comprising an on-core L1 cache 104, an L2 cache 106 and a memory 108. The L1 cache 104 and L2 cache 106 are high speed memories that can be accessed relatively quickly by the CPU, but have a relatively limited storage capacity, with the L1 cache 104 being faster and smaller than the L2 cache 106. On the other hand, the memory 108 is a slow speed memory, but has a relatively large storage capacity. The CPU 102 is coupled to the memory 108 via data bus 110, which may also connect to other processors in a multiprocessor arrangement. The memory units form a hierarchical memory system, and when the CPU 102 performs a data processing operation, a request for target data may be propagated from the CPU 102 towards memory 108 and via the caches 104, 106, such that each stage of the memory hierarchy will be sequentially checked until that particular data is found. The data is then transferred to the CPU 102 where the data processing operation is performed and the result is stored in the L1 cache 104.

In this embodiment, supplemental processing elements 112 are also arranged in association with the L2 cache 106 and the memory 108, and are configured to perform a subset of the data processing operations performable by the CPU 102. Therefore the L2 cache 106 and the memory 108 also have some capability to perform data processing operations, and in some instances, the apparatus 100 may perform a far operation by sending an operation request to the L2 cache 106, causing the processing element 112-2 to perform the data processing operation corresponding to the operation request, and to store the result in the L2 cache 106 for example. Similarly, the operation request may be sent to the memory 108, causing processing element 112-4 to perform the data processing operation and to store the result in the memory 108.

The performance of near and far operations may be controlled by the operation controller 114. For example, when a data processing operation is to be performed near, the operation controller 114 sends a request for the data to the memory hierarchy, so that the data can be returned to the CPU 102. The data processing operation can then be performed by the CPU 102 on the retrieved data. On the other hand, when a data processing operation is to be performed far, the operation controller 114 instead sends the operation request to the memory processing element 112-4 of memory 108 for example. Processing element 112-4 will then retrieve the relevant data and perform the data processing operation and store the result in the memory 108. Alternatively, a far operation may also be performed by processing element 112-2, with the result data being stored in the L2 cache 106 for example. To maintain coherency in the apparatus, near and far operations may be performed as atomic operations, such that they cannot be interrupted by other processes. In some examples, operations that can be performed as either near or far operations are performed as atomic operations, which cannot be interrupted by other processes. This reduces the likelihood of memory hazards such as read-after-writes, and write-after-reads from occurring for example.

While far operations can reduce the transfer of data in the apparatus 100, in some cases performing data processing operations in this way may not be efficient. For example, the present technique recognises that an obscure cost of the reduced data transfer achieved by far operations is the latency that may be incurred should the CPU 102 later require the result data of the far operation, since retrieving data from the memory 108, or the L2 cache 106 takes longer than retrieving data from the L1 cache 104. Moreover, this latency may only be experienced some time after the far operation which stored the result data away from the CPU 102 was performed. Therefore, this consequence of the far operation is not evidently linked to the operation itself.

To efficiently organise the performance of near and far operations, the CPU 102 further comprises predictor circuitry 108, which is configured to predict a redundancy period of a result of a data processing operation to be performed by the apparatus 100. The predicted redundancy period is indicative of the estimated period of time where the result data will not be required for data processing, and thus serves as a good basis for determining where the operation should be performed. For example, should the predictor circuitry 108 indicate that the result of a given data processing operation is going to be required for data processing in the near future, then the data processing operation should performed by the CPU 102 as a near operation, with the result being stored in the L1 cache 104 so that it can be accessed again quickly. This reduces the latency throughout the apparatus 100. On the other hand, if the predictor circuitry 108 indicates that the result of the data processing operation is not going to be required for data processing for some time, then the data processing operation is performed as a far operation. While a latency is still experienced when the CPU 102 later accesses the result, performing a far operation on this basis reduces the amount of non-critical data stored in the L1 cache 104, as there may be other data which is more urgently required by the CPU 102 that would be more efficient to store in the L1 cache 104.

Figure 2:
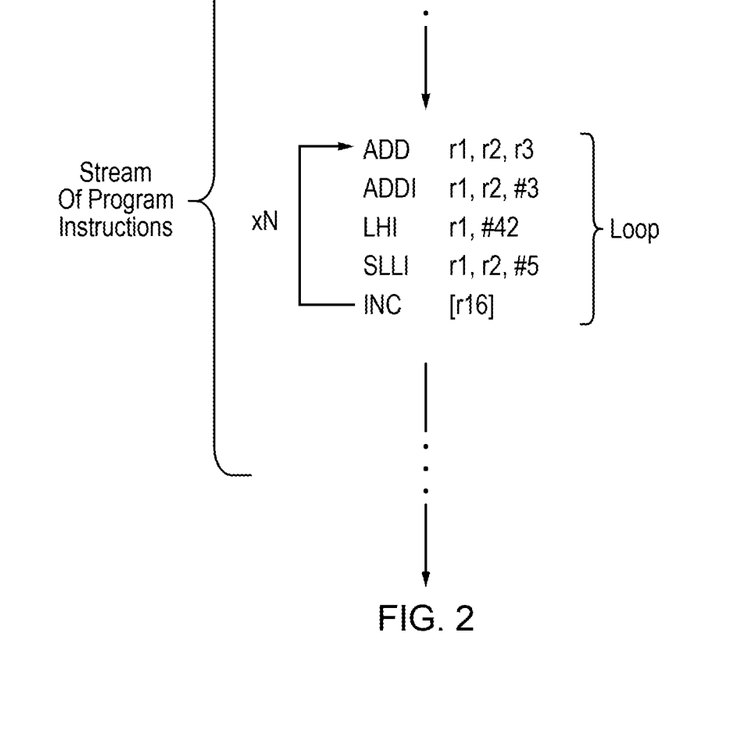
FIG. 2 shows a stream of program instruction to which the present technique may be applied.

FIG. 2 shows one example of a stream of program instructions which may be executed by the apparatus 100, and to which the present technique may be applied. As can be seen, the stream of program instructions comprises a sequence of five instructions in a loop, which is to be repeated N times. Whilst executing these instructions in the loop, the period (e.g. an instruction distance) between successive execution of the same instruction will be relatively regular, given that the intervening instructions will likely comprise the four remaining instructions in the loop. Therefore, by monitoring the period between execution of the same instruction, a good indication of when that same instruction will be executed again can be derived. Furthermore, the loop comprises an increment instruction (INC), that increments an operand at an address stored in register r16. The INC instruction thus generates a value which is to be subsequently consumed by execution of the INC instruction during the next iteration of the loop. Considering three iterations of the loop, the period between the first and second execution of the INC instruction can act as a prediction of the redundant period between the second and third execution of the INC instruction. This makes the INC instruction a good candidate for the present technique, because the redundancy period of the result generated by the increment instruction during a given iteration of the loop can be accurately predicted based the period between previous execution of the increment instruction in consecutive iterations of the loop.

When the apparatus 100 is executing the stream of program instructions illustrated in FIG. 2, the predictor circuitry 108 monitors the program counter register 106, which indicates the current instruction being executed by the apparatus 100. By monitoring the program counter 106, the predictor circuitry 108 can measure the period between successive execution of the increment instruction, for example, and use this measure as an indication of how long the result of a subsequent increment instruction will be redundant, and not required by the apparatus 100. On this basis the predictor circuitry 108 can provide an indication of whether the result of subsequent execution of the increment instruction should be performed near, by the CPU 102 with the result being stored in the L1 cache 104, or far, by one of the processing elements 112-2, 112-4, with the result being stored in either the L2 cache 106 or the memory 108 respectively.

Figure 3:
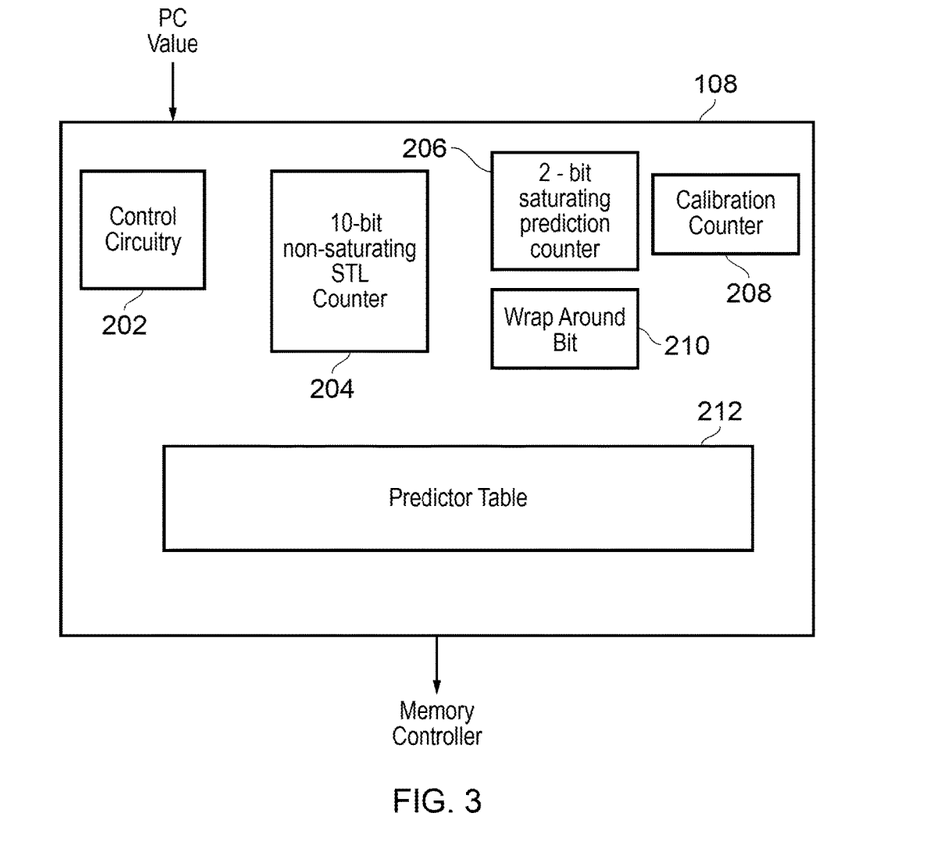
FIG. 3 schematically illustrates one example of predictor circuitry.

FIG. 3 schematically illustrates the predictor circuitry 108 in more detail. The predictor circuitry 108 comprises control circuitry 202 which is configured to monitor the program counter value from the program counter register 106. The control circuitry 108 also controls a number of counters comprising a 10-bit non-saturating store to load (STL) counter 204, a 2-bit saturating prediction counter 206, and a 10-bit calibration counter 208, as well as a wrap-around bit 210. In conjunction with the counters the control circuitry 202 is configured to maintain a predictor table 212, which indicates the predicted redundancy period for data processing operations to be performed in response to instructions at certain program counter registers. It will be appreciated that the bit sizes of the counters of this implementation are merely examples, and other implementations may comprises counters of other bit sizes.

Figure 4:
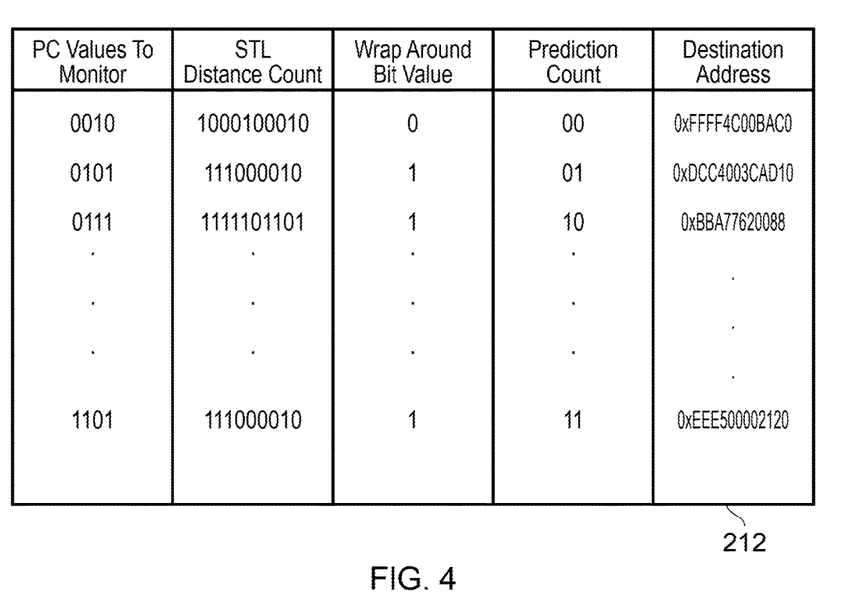
FIG. 4 shows one example of a predictor table according to the present technique.

FIG. 4 shows one example of the predictor table 212 as maintained by the predictor circuitry 108 of FIG. 3. The predictor table 212 stores the program counter values of the instructions that are to be monitored. This field may be populated in advance by a programmer with the program counter values corresponding to suitable candidate instructions, or by detection circuitry that monitors data processing for instructions which are repeatedly executed, and cause data processing of the same variable or location, in the manner described above. In any case, the program counter values to be monitored as defined in the predictor table 212 can be compared to the current program counter value of the program counter register 106 to determine when the predictor circuitry 108 is to monitor data processing, and predict redundancy periods.

Figure 5:
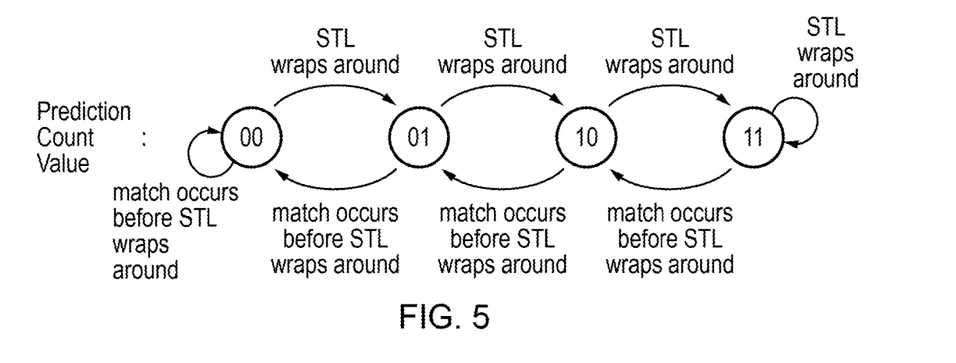
FIG. 5 shows how the state of a predictor count may be updated to predict a redundancy period.

FIG. 5 shows one example of how the state of the prediction counter changes based on the STL distance counter 204, and the state of the wrap around bit 210. For a first prediction of the redundancy period, the prediction count value for a given program counter value may be set to be one of the four states shown in FIG. 5. When the given program counter value matches a current value of the program counter register, the non-saturating STL counter 204 begins incrementing at a constant rate, for example once per processor cycle. Each time the STL distance counter 204 reaches its maximum value, and then wraps around, the prediction counter increments by one, increasing the prediction count value. The STL counter 204 continues incrementing and the prediction counter keeps increasing as specified until the next match between the given program counter value and the current value of the program counter register is observed. When this occurs the value of the prediction counter is used to determine the prediction count recorded in the predictor table 212. Alternatively, the next match between the given program counter value and the current value of the program counter register may occur before the STL wraps around. In this case, the prediction counter is instead configured to decrement (or remain at 00 if the prediction counter is already 00), and the prediction count value in the predictor table will be updated accordingly. To determine whether the next match has occurred before the STL distance counter 204 wraps around, a wrap-around bit is configured to be set to '1' the first time the STL distance counter wraps around when a match is observed. This way, when the next match is observed, a decrement of the prediction counter can be performed based on whether the wrap around bit has been set or not.

The prediction count for a given program counter value thus corresponds to the period between a current execution and a previous execution of the instruction at that program counter value. The loop shown in FIG. 2 includes an increment instruction. The increment instruction has a single operand—r16. Ordinarily, this instruction would take the value from the address at r16, increment it, and write the data back to the address at r16. Given that no other instructions in the loop operate on this operand, a value of the prediction count, calculated in the manner described above, can be used to predict a redundancy period of the result data from executing this instruction. On the basis of this predicted redundancy period, a destination address for the instruction can be set in the predictor table 112 to dictate the location (e.g. a cache line) where the result of the increment instruction should be written, rather than the address at r16. Moreover, the operation controller 114 will control the apparatus 100 to either perform the data processing operation near or far based on the destination address set in the predictor table 112. In the example of FIG. 4, the destination address is a 48-bit address that points to a specific location in system-memory. The exact number of bits to specify the destination address may vary in a specific implementation. When this data processing operation is performed as a near operation, the destination address is set as a location in the L1 cache, so when the instruction is executed, the CPU retrieves the value from the address at r16, increments it, and stores the result at the destination address in the L1 cache. On the other hand, when a far operation is performed, the destination address is set as a location in memory, for example, and the operation controller 114 sends an operation request to processing element 112-4 to perform the data processing operation. Consequently, the data processing operation is not performed by the CPU 102 itself. In response to the operation request, processing element 112-4 will read the value from the address location at r16, increment it, and store the result at the destination address in memory 108. The next time access to the address location at r16 is requested, the operation controller 104 will divert the access request to the destination address in memory. In either case, the operation controller 104 tracks the actual location of the result for a given data processing operation (identified by a program counter value) via the 'destination address' column in the predictor table 212 shown in FIG. 4.

For example, the instruction corresponding to the program counter value '0010' in the predictor table 112 of FIG. 4 has a prediction count of '00'. On this basis, the predictor circuitry 108 predicts that a result of executing this instruction in the future will have a short redundancy period, and the period between the result being generated and the result being consumed again will be relatively small. Therefore, the predictor circuitry 108 sets the destination address for this instruction to a location in the L1 cache 104, and when this instruction is subsequently executed, it is executed by the CPU 102 and the result is stored in the L1 cache where it will be available relatively quickly.

In contrast, the instruction corresponding to the program counter value '1101' has a prediction count of '11'. This indicates that the period between the result of previous execution of this instruction and this result being consumed in subsequent execution of this instruction was relatively long. Therefore, it is predicted that future execution of this instruction will also generate a result having a relatively long redundancy period, so the predictor circuitry 108 sets the destination address for this instruction to a location in memory 108, and when this instruction is next executed, the operation controller 114 sends an operation request to the memory, so that the processing element 112-4 executes the instruction and stores the result in memory 108. When this result is subsequently required, the operation controller will divert an access request for the result to the corresponding location in memory 108.

The instructions corresponding to the program counter values '0101' and '0111' have previously generated result having redundancy periods longer than the instruction corresponding to '0010' but shorter than the instruction corresponding '1101'. As a middle ground operation requests for these instructions can be sent to the L2 cache 106, where processing element 112-2 will execute the instructions and result in the L2 cache 106.

As can be seen from the examples shown in FIG. 4, the two bit prediction counter is suitable for the apparatus of FIG. 1, since the counter has 4 possible states, which can be assigned to the three possible locations for a data processing operation to be performed. That is, as can be seen from FIG. 4, a prediction count of '00' corresponds to the L1 cache, a prediction count of '11' corresponds to memory, and prediction counts of '01' and '10' correspond to the L2 cache. In other apparatuses, which may comprise more locations at which a data processing operation can be performed, a larger prediction counter may be required to provide sufficient states to correspond to each of the locations.

As can be seen from FIG. 3, the predictor circuitry 108 further comprises a calibration counter 208 to maintain a calibration count. The predictor circuitry 108 uses the calibration count to bias future predictions towards near or far operations based on how successful previous predictions have been.

Figure 6:
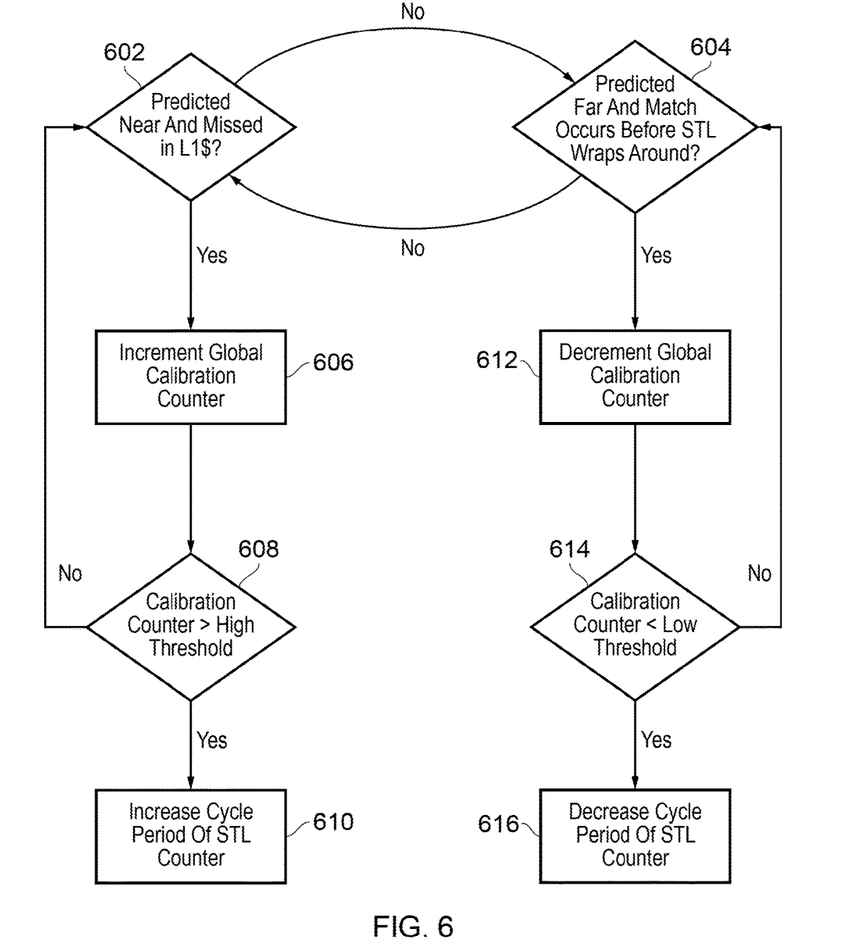
FIG. 6 shows a method for biasing predictions.

FIG. 6 shows one example of a method for calibration. Step 602 monitors the apparatus for instances when a data processing operation is performed near based on a short predicted redundancy period, but when the result data has been next requested, the request misses in the L1 cache 104. This suggests that the result data was evicted from the L1 cache 104 because more critical data needed to be stored there. When this occurs, the calibration counter is incremented, as shown in step 606, and compared to a high threshold as shown in step 608. If the calibration counter exceeds the high threshold (e.g. 0x2FF when the calibration counter is a 10-bit counter), this indicates that data processing operations are being performed near too often, with their result data being evicted from the L1 cache before it is subsequently required for data processing. Therefore, the rate at which STL distance counter increments is increased, to increase the number of far operations that will be performed.

The process of biasing in the other direction is similar, however, instead step 604 monitors the apparatus for instances when a data processing operation is performed far, but a subsequent program counter match occurs before the STL distance counter wraps around. This indicates that the result data has been requested in a relatively quickly, and that it would have been beneficial if the result data were instead in the L1 cache 104 for example. When this occurs, the calibration counter is decremented as shown in step 612, and compared to a low threshold (e.g. 0xFF when the calibration counter is a 10-bit counter) as shown in step 614. When the calibration counter is less than the low threshold, the cycle period of the STL counter is decreased, to increase the number of near operations that will be performed.

Figure 7:
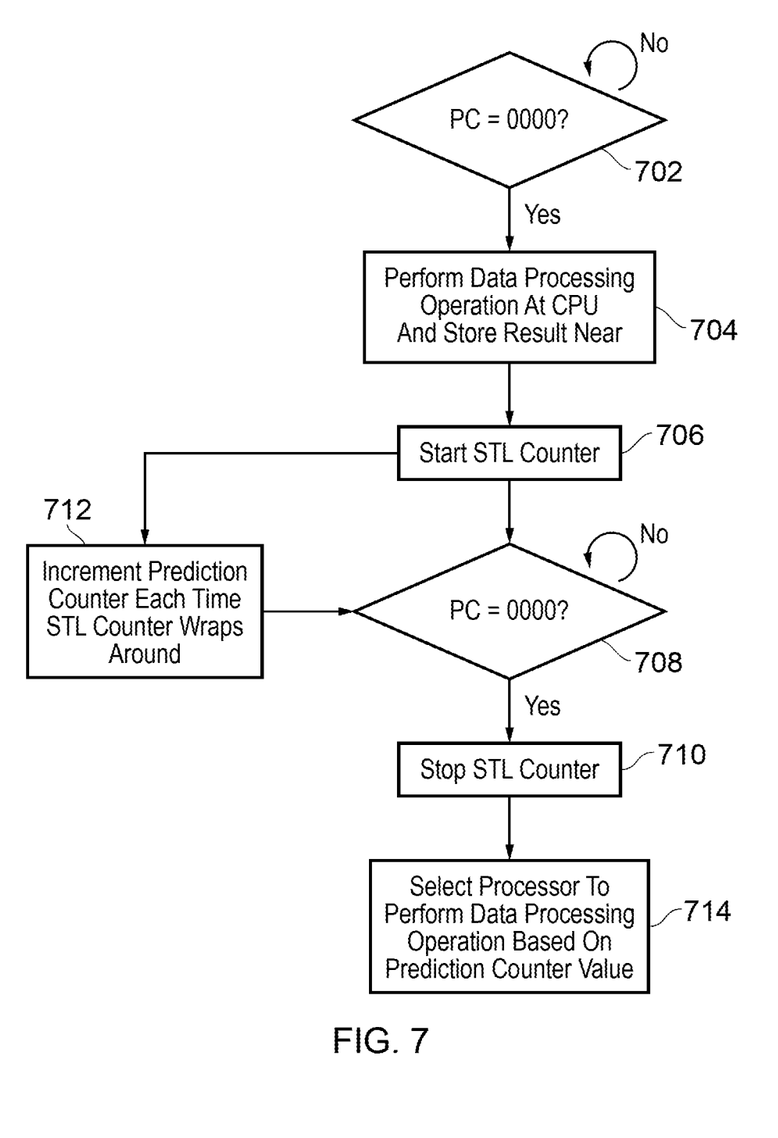
FIG. 7 a method for scheduling operations as far operations or near operations based on a predicted redundancy period.

FIG. 7 shows one example of a method for predicting a redundancy period and selecting a processor element to perform subsequent data processing operation at a given program counter value of '0000' based on the predicted redundancy period. In step 702, the program counter register is monitored for a program counter value of '0000'. The instruction corresponding to this program counter value may have been predefined by a programmer as a suitable candidate for the present technique, or may have been identified by detection circuitry. When a match occurs, in step 704 the instruction corresponding to '0000' is executed at the CPU and the result is stored near. This is the default process for when a predicted redundancy period for a given program counter value is unavailable. It will be appreciated that in other examples, the default process could be to send an operation request such that the instruction is executed at a far location. In response to the data processing operation being performed, an STL counter is started as shown in step 706. The STL counter continues to increment, and each time the STL counter wraps around, the prediction counter also increments, as shown in step 712. This continues until the program counter reaches '0000' again, as shown in step 708, at which point the STL counter is stopped. In step 714, a processor to perform the data processing operation corresponding to the instruction at '0000' is selected based on the prediction counter value.

Figure 8:
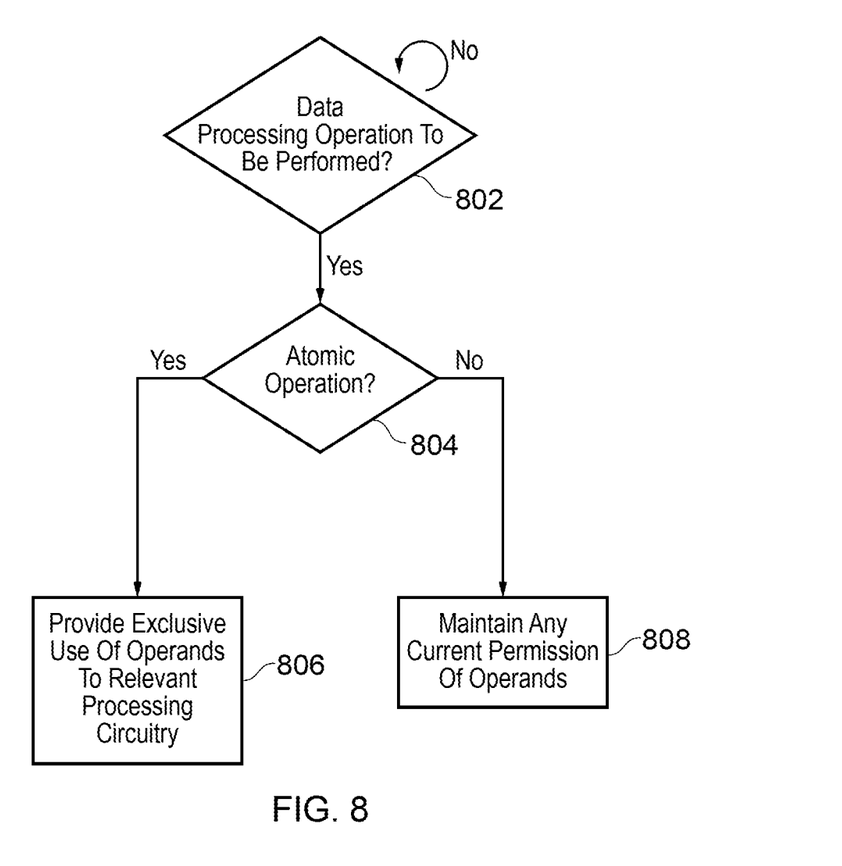
FIG. 8 shows a method for controlling performance of atomic operations.

FIG. 8 shows an example of handling atomic/non-atomic operations. In step 802 it is monitored whether any data processing operations are to be performed. When this is the case, it is checked whether the data processing operation is to be performed as an atomic operation as shown in step 804. When the data processing operation is to be performed as an atomic operation, the operation controller 114 provides exclusive use of the operands to processing circuitry that is to perform the data processing operation. On the other hand, when the data processing operation is not to be performed as an atomic operation, the operation controller simply maintains any current permissions of the operands of the data processing operation.

Figure 9:
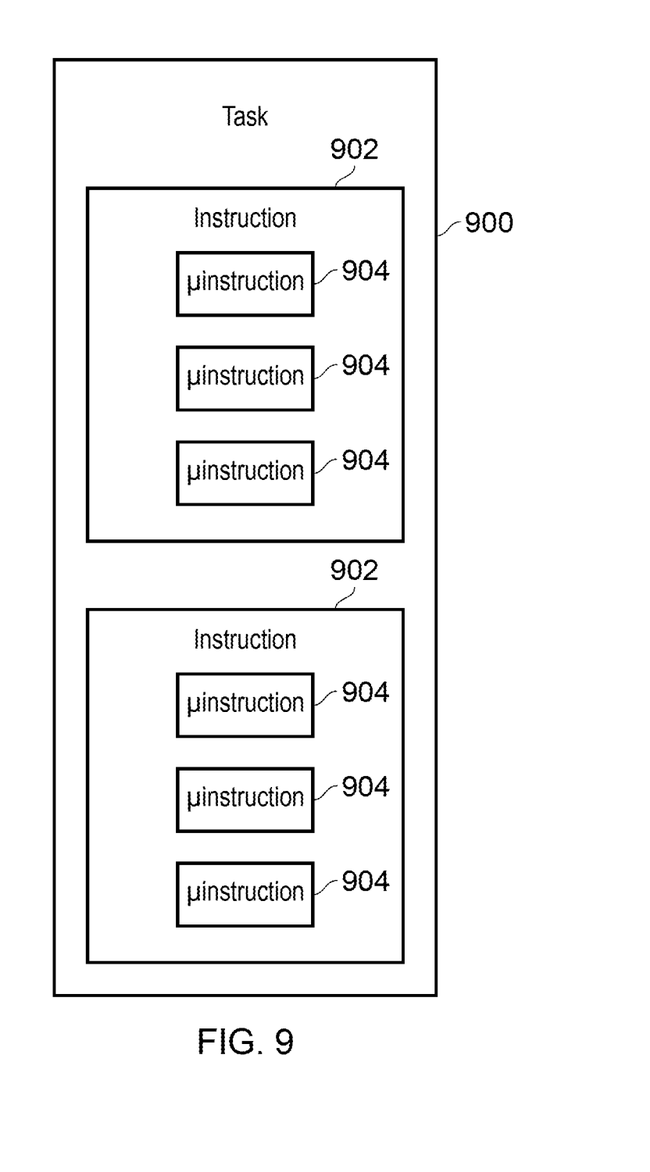
FIG. 9 shows the logical relationship between microinstructions, instructions and tasks.

In the present technique, near and far operations may be performed in response to any of: microinstructions, instructions, and tasks. FIG. 9 shows the relationship logical relationship between these elements. Instructions 902 are defined in an instruction set of the instruction set architecture of an apparatus, and data processing operations are performed in response to those instructions. However, from a logical view, the data processing operation performed in response to an instruction may also be performed in response to a series of micro-instructions (μ-instructions) 904, each causing a micro-operation to be performed. Similarly, instructions may be grouped together to form a task 900, which will cause a series of data processing operations to be performed. For example, the data processing operations performed in response to an ADD instruction comprise a series of sets, such as: loading the contents of a register to an ALU, performing an addition operation, and storing the result in another register. Each of these data processing operations may be instructed independently by a series of micro-instructions. Similarly, several ADD instructions may be coalesced to form a task.

Figure 10:
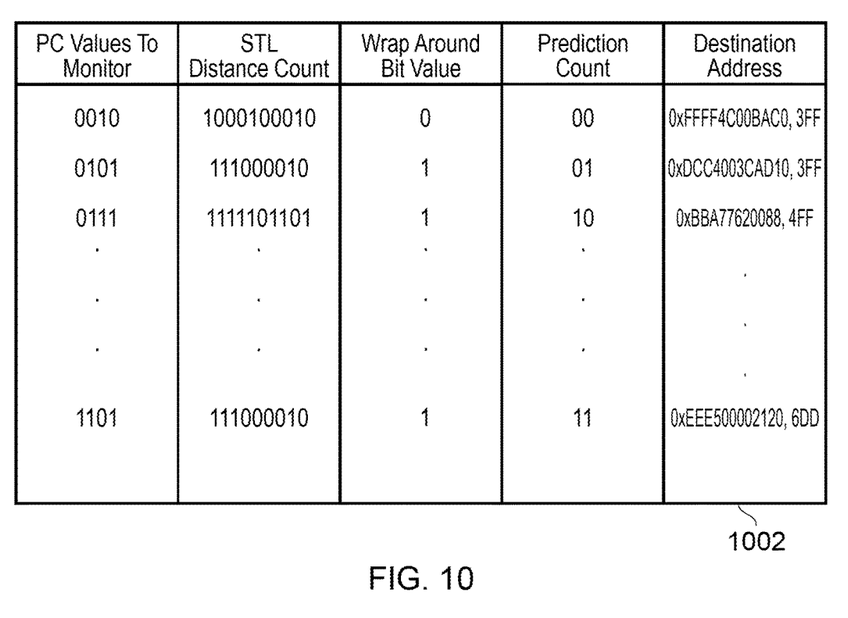
FIG. 10 shows one example of a predictor table relating to non-atomic instructions according to the present technique.

FIG. 10 shows another example of a predictor table 1002 in accordance with the present technique when applied to tasks that are performed as transactions. Accordingly, it can be seen that the present technique can be applied to non-atomic operations as well as atomic operations. The predictor table 1002 is similar to that of FIG. 4, except that the program counter values to monitor are set to the program counter values of a first instruction of a task, and an entire range of addresses can be defined in relation to a program counter value, each address of the range corresponding to an instruction of the task. As can be seen from FIG. 10, the range of destination addresses is specified in the format of a 48-bit base address, and a range size. In this way, when the redundancy period for a task is predicted, each of the instructions that make up the task can be performed near or far based on a corresponding one of the range of addresses for the task.

In summary, the techniques described above increase the chance that data will stored appropriately in dependence on when it will be required next.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
a plurality of memory units organised as a hierarchical memory system, wherein each of at least some of said memory units is associated with a processor element;
predictor circuitry to perform a prediction process to determine a predicted redundancy period of result data of a data processing operation to be performed, indicating a predicted point when said result data will be next accessed; and
an operation controller to cause a selected processor element to perform said data processing operation, wherein said selected processor element is selected based on said predicted redundancy period,
wherein said data processing operation is performed in response to execution of a given instruction from a series of instructions comprising a loop, and said prediction process is based on a processing period of one iteration of said loop.

2. An apparatus according to claim 1, wherein a relationship between an access speed of a memory unit associated with said selected processor element and said predicted redundancy period is that as said predicted redundancy period decreases, said access speed increases.

3. An apparatus according to claim 1, wherein in response to said predicted redundancy period indicating that said result data will be accessed again within a reuse period, said selected processor element is associated with a faster memory unit that can be accessed more quickly than another of said memory units and said selected processor element stores said result data in said faster memory unit.

4. An apparatus according to claim 1, wherein in response to said predicted redundancy period indicating an absence of further accesses to said result data within a reuse period, said selected processor element is a processor element associated with a slower memory unit that can be accessed less quickly than said faster memory unit and said selected processor stores said result data in said slower memory unit.

5. An apparatus according to claim 1, wherein said prediction process uses historical data.

6. An apparatus according to claim 1, wherein said prediction process uses historical data of a redundancy period of an operand of a previous data processing operation used to generate said result data.

7. An apparatus according to claim 6, wherein said historical data is a most recent redundancy period of said operand.

8. An apparatus according to claim 1, further comprising a non-saturating counter to increment during said one iteration of said loop, and a saturating counter to determine a wrap around count of said non-saturating counter, wherein said prediction process uses said wrap around count.

9. An apparatus according to claim 1, wherein said prediction processes is affected by a bias value; and
said bias value is adjusted by comparing a previously predicted redundancy period of further result data with a redundancy period of said further result data.

10. An apparatus according to claim 9, wherein when said previously predicted redundancy period is less than said redundancy period of said result data, said bias value is adjusted to bias selection towards a processor element associated with a slower memory unit, and when said bias value indicates that said previously predicted redundancy period is greater than said redundancy period said predictor circuitry is configured to bias selection towards a processor element associated with a faster memory unit.

11. An apparatus according to claim 1, wherein said prediction processes is affected by a bias value;
said operation controller is adapted to cause a previous selected processor element to perform a previous data processing operation to produce previous result data;
said previous result data is stored in one of said plurality of memory units associated with said previous selected processor element; and
said bias value is adjusted by whether a previous access request for said previous result data hits or misses in said one of said plurality of memory units associated with said previous selected processor element.

12. An apparatus according to claim 11, wherein
said bias value is adjusted to bias selection towards a processor element associated with a slower memory unit in response to said previous access request missing.

13. An apparatus according to claim 1, wherein said data processing operation is performed as an atomic operation.

14. An apparatus according to claim 1, wherein said operation controller is configured to provide said selected processor with exclusive use of source data required to perform said data processing operation.

15. An apparatus according to claim 1, wherein said data processing operation is performed in response to one of:
   a microinstruction;
   an instruction; or
   a task comprising a plurality of instructions.

16. A method for use in an apparatus comprising a plurality of memory units organised as a hierarchical memory system, wherein each of at least some of said memory units is associated with a processor element, said method comprising:
   performing a prediction process to determine a predicted redundancy period of result data of a data processing operation to performed, indicating a predicted point when said result data will be next accessed; and
   selecting a selected processor element to perform said data processing operation, wherein said selected processor element is selected based on said predicted redundancy period,
   wherein said data processing operation is performed in response to execution of a given instruction from a series of instructions comprising a loop, and said prediction process is based on a processing period of one iteration of said loop.

* * * * *